(No Model.)

C. VAN GRAAFEILAND.
ADVERTISING DEVICE.

No. 433,222. Patented July 29, 1890.

Witnesses
G. G. Shoop
M. S. Reeder

Inventor
Charles Van Graafeiland,
By Fowle & Fowle
Attorneys.

UNITED STATES PATENT OFFICE.

CHARLES VAN GRAAFEILAND, OF ST. LOUIS, MISSOURI.

ADVERTISING DEVICE.

SPECIFICATION forming part of Letters Patent No. 433,222, dated July 29, 1890.

Application filed January 20, 1890. Serial No. 337,423. (No model.)

*To all whom it may concern:*

Be it known that I, CHARLES VAN GRAAF-EILAND, a citizen of the United States, residing at St. Louis, in the State of Missouri, have invented a certain new and useful Advertising Device, of which the following is such a full, clear, and exact description as will enable any one skilled in the art to which it appertains to make and use the same, reference being had to the accompanying drawings, forming part of this specification.

The object of my invention is to make advertising-matter more conspicuous.

The invention consists of cutting advertising-matter in a plate, sheet, or casing, and using, in connection therewith, an interior casing or other means containing a ball of twine used for wrapping purposes in stores, or containing any roll of material, which casings are actuated by taking hold of the twine in the act of tying a bundle, or in unwinding material from the roll, to render the advertising matter cut through said plate, sheet, or first-mentioned casing more conspicuous.

Figure 1:
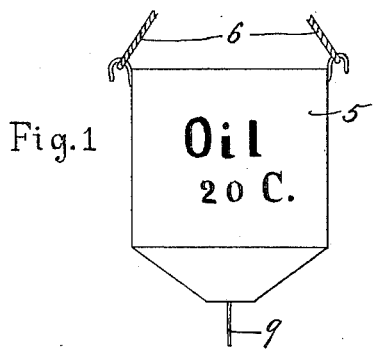
Figure 2:
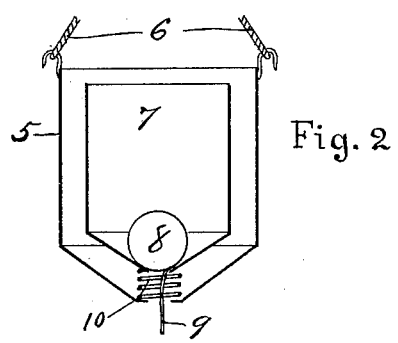
Figure 3:
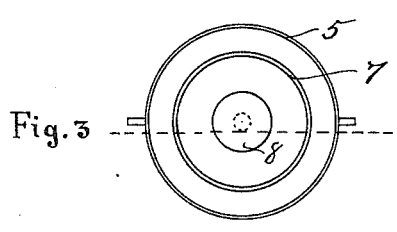
Figure 4:
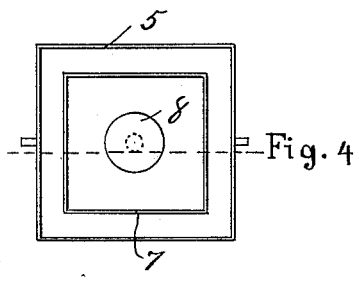

Referring to the accompanying drawings, in which I have illustrated my invention, Figure 1 is an elevation of the same; Fig. 2, a vertical section thereof on the dotted lines shown in Figs. 3 and 4; and Figs. 3 and 4, plan views thereof, showing round and square casings, respectively.

The same figures of reference indicate the same parts throughout the several views.

5 is a casing, sheet, or plate in which I cut the sign or intelligent information to be advertised—for instance, "Oil, 20 cents," or any other matter to be advertised. This casing is supported in any suitable way, and may be sustained by chains or cords 6, attached to any object or in any other way. Within this casing I place, preferably, another casing 7 or other device, which may contain a ball of twine 8 or roll of other material, the free end 9 of which passes down through apertures in the casings 7 and 5 to within easy reach. The casing 7 is preferably sustained within the casing 5 by means of a spring 10, so that when the end of the twine or roll of material is taken hold of to unwind some of it the casing 7 will be actuated. The letters of the advertisement are cut through the casing 5, and the outside of the casing 7, that is opposite the letters cut through said casing 5, is made of or covered with some iridescent, scintillating, reflecting, or colored material, whereby when said casing 7 is actuated in unwinding material from the ball or roll it will cause the letters cut through the outer casing 5 to scintillate, and thus attract attention thereto and advertise the matter that is to be called to the attention of persons.

It matters not, of course, whether the outer casing or the inner casing be moved in manipulating the roll or ball of material, and therefore I regard it within the spirit of my invention to sustain the outer casing flexibly by means of a spring or springs and to allow the inner casing to be stationary, or to have both of said casings mounted by springs and actuated in taking hold of the end of the ball or roll of material.

The casings can be made of any shape and dimensions.

Various changes may be made in the way of arranging and constructing the parts without departing from the spirit of my invention. I do not wish, therefore, to limit myself specifically to the devices herein shown; but What I desire to claim and secure by Letters Patent of the United States as my invention is—

1. A sign displaying intelligent information cut through a sheet, plate, or casing and having opposite the characters cut through said sheet, plate, or casing a receptacle provided with a scintillating, reflecting, or colored substance, in which receptacle a roll or ball of twine or other material is contained, and material to be unrolled therefrom, substantially as and for the purpose described.

2. A sign displaying intelligent information cut through a sheet, plate, or casing and having opposite the characters cut through said sheet, plate, or casing a receptacle provided with a scintillating, reflecting, or colored substance, in which receptacle a roll or ball of twine or other material is contained, and material to be unrolled therefrom, and a flexible support for one or more of said parts, substantially as and for the purpose described.

In testimony whereof I have hereunto set my hand and affixed my seal, this 16th day of January, 1890, in the presence of the two subscribing witnesses.

CHARLES VAN GRAAFEILAND. [L. S.]

Witnesses:
A. C. FOWLER,
JULIUS J. KOCH.